United States Patent [19]

Hertzog

[11] 4,284,886
[45] Aug. 18, 1981

[54] RANDOM PULSING OF NEUTRON SOURCE FOR INELASTIC NEUTRON SCATTERING GAMMA RAY SPECTROSCOPY

[75] Inventor: Russel C. Hertzog, Ridgefield, Conn.

[73] Assignee: Schlumberger Technology Corporation, New York, N.Y.

[21] Appl. No.: 28,953

[22] Filed: Apr. 11, 1979

[51] Int. Cl.³ .............................................. G01V 5/00
[52] U.S. Cl. .................................... 250/270; 250/262
[58] Field of Search ................ 250/270, 269, 267, 262

[56] References Cited

U.S. PATENT DOCUMENTS

| 3,885,154 | 5/1975 | Culver | 250/267 |
| 3,973,131 | 8/1976 | Malone et al. | 250/270 |
| 4,055,763 | 10/1977 | Antkiw | 250/270 |

OTHER PUBLICATIONS

Tittman et al., "Laboratory Studies of a Pulsed Neutron Source Technique in Well Logging", Tech. Note 2061, J. Petroleum Tech., 1960.

Primary Examiner—Alfred E. Smith
Assistant Examiner—Carolyn E. Fields
Attorney, Agent, or Firm—Henry N. Garrana; Stephen L. Borst

[57] ABSTRACT

Method and apparatus, for use in the detection of inelastic neutron scattering gamma ray spectroscopy, effect data acquisition efficiency enhancement by operating a neutron generator such that a resulting output burst of fast neutrons is maintained for as long as practicably possible until a gamma ray is detected. Upon the detection of a gamma ray the generator burst output is terminated. Pulsing of the generator may be accomplished either by controlling the burst period relative to the burst interval to achieve a constant duty cycle for the operation of the generator or by maintaining the burst period constant and controlling the burst interval such that the resulting mean burst interval corresponds to a burst time interval which reduces contributions to the detected radiation of radiation occasioned by other than the fast neutrons.

17 Claims, 3 Drawing Figures 4,284,886

RANDOM PULSING OF NEUTRON SOURCE FOR INELASTIC NEUTRON SCATTERING GAMMA RAY SPECTROSCOPY

BACKGROUND OF THE INVENTION

1. Field of the Invention

The present invention relates generaly to a novel system for radioactive well logging and more particularly to systems for control of the operation of a neutron generator to effect well logging data acquisition enhancement.

2. The Prior Art

In one illustrative process for radioactive well logging described in "Laboratory Studies of a Pulsed Neutron-Source Technique in Well Logging," Technical Note 2061, Journal of Petroleum Technology, 1960, by J. Tittman and W. Nelligan, the presence of hydrocarbons can be determined by the detection of gamma rays produced by inelastic scattering of fast neutrons from carbon nuclei in the earth formation under investigation. The neutrons are generated by fast neutron sources of the accelerator type, such as the 14 MeV generators disclosed in U.S. Pat. Nos. 3,461,291 to C. Goodman and 3,546,512 to A. H. Frentrop. These neutron generators are operated so as to produce fixed width neutron bursts generally of the order of 18 microseconds at a fixed repetition rate of the order of 10 kHz. A detector is gated coincidentally with operation of the fast neutron source to obtain an inelastic gamma ray spectrum.

The detector, which may be a crystal scintillator coupled to a photomultiplier, receives the radiation occasioned in the formation by the fast neutrons and generates a corresponding pulse. The output of the detector is coupled into an amplifier whose output in turn is applied to a discriminator employed as a threshold device to remove pulses having amplitudes below and above given threshold values which might otherwise cause pile-up on transmission lines. The output of the discriminator is applied to further processing apparatus for deriving therefrom information regarding, for example, the presence of hydrocarbons in the formations.

It has also been proposed, in U.S. Pat. No. 3,885,154 for R. B. Culver, to irradiate a formation surrounding a borehole with discrete bursts of fast neutrons at a fixed repetition rate; the duration of each burst being 10 microseconds. This burst duration interval is chosen, along with a corresponding detector gate interval, to reduce inelastic measurement contamination by capture gamma ray background. Additionally, Culver proposes to further reduce the capture gamma ray background, without reducing the inelastic gamma ray production, by shortening the burst duration interval as a function of the detected radiation.

While the scheme for neutron generator operation proposed by Culver effects a reduction of capture gamma ray background in the detected inelastic measurements, it will be appreciated that no enhancement in the data acquisition rate is effected over the fixed burst duration interval operation scheme since the burst repetition frequency is constant and the resulting mean burst width is narrower than the fixed burst width. Moreover, since the ratio of the generator "on" interval to the generator "off" interval "duty cycle" for the operation of the neutron generator is variable, the generator is often not operated at the "optimum" duty cycle for efficient operation of the generator.

SUMMARY OF THE INVENTION

In accordance with the principles of the present invention, a well logging tool illustratively including a neutron generator is operated in a manner such that generated neutron bursts are maintained at a constant output for as long as practicably possible (up to a cut-off time) so long as no gamma ray is detected. Upon the detection of a gamma ray the generator burst output is terminated. Moreover, the neutron generator is operated in a manner such that the mean burst interval corresponds to a burst interval selected relative to the burst period such as to minimize the capture components in the inelastic measurements. Since the burst interval itself is variable, the data acquisition rate is enhanced since at least some of the burst intervals will be long enough to effect data acquisition which may not have been possible where the burst interval was fixed and not long enough.

In further accordance with the principles of the present invention, a well logging tool illustratively including a neutron generator is operated in a manner such that generated neutron bursts are maintained at a constant output for as long as practicably possible (up to a cut-off time) so long as no gamma ray is detected. Upon the detection of a gamma ray the generator burst output is terminated. Moreover, the neutron generator is operated in a manner such that the interval between bursts is related to the burst duration such that the burst repetition frequency and period become variable and therefore "adapt" to the local borehole environment. This adaptation to the local environment effects data acquisition enhancement since, in contrast with the prior art systems, the system of the present invention is capable of significantly increasing its burst repetition rate when the detection of gamma rays occurs early enough in the burst interval for a large number of intervals, whereas the prior art systems, under the same circumstances are limited by the constant burst repetition rate selected for their operation. It will be appreciated that this data acquisition enhancement is realized for all operational conditions except where the detection of gamma rays consistently occurs at the end of the selected cut-off time, corresponding to the prior art fixed burst duration, for the burst interval.

In accordance with yet further principles of the present invention, the operation of a neutron generator is controlled such that the interval between bursts bears a direct relationship to the burst duration and is selected such that the generator is operated in a mode which effects enhancement of the operational characteristics of the generator. For example, the direct relationship between burst duration and the duration of the interval between bursts can be selected to effect operation of the generator at an "optimum" duty cycle for efficient neutron production by the generator.

In accordance with one embodiment of the present invention a method for providing a radioactivity log of a formation surrounding a borehole, comprises the steps of:

Irradiating the formation with a succession of discrete bursts of fast neutrons at a given burst period, each burst having a variable time interval;

Detecting radiation occasioned in the formation by the fast neutrons;

Selecting a burst time interval at the given burst period which reduces radiation occasioned in the formation by other than fast neutrons; and Limiting the number of fast neutrons generated in each of the bursts by shortening the time interval as a function of the detected radiation such that the mean time interval resulting corresponds to the selected burst time interval.

In accordance with yet another embodiment of the present invention, a method for providing a radioactivity log of a formation surrounding a borehole, comprises the steps of:

Irradiating the formation with a succession of discrete bursts of fast neutrons, each burst having a variable time interval;

Detecting radiation occasioned in the formation by the fast neutrons;

Limiting the number of fast neutrons generated in each of the bursts by shortening the time interval as a function of the detected radiation; and Varying the frequency of the succession of discrete bursts to provide for a predetermined relationship between the variable time interval and the time interval between succeeding discrete bursts which follows each of the bursts.

BRIEF DESCRIPTION OF THE DRAWINGS

The foregoing and other features of the invention will be more readily apparent from the following detailed description and drawings of illustrative embodiments of the invention, in which.

DETAILED DESCRIPTION

Figure 1:
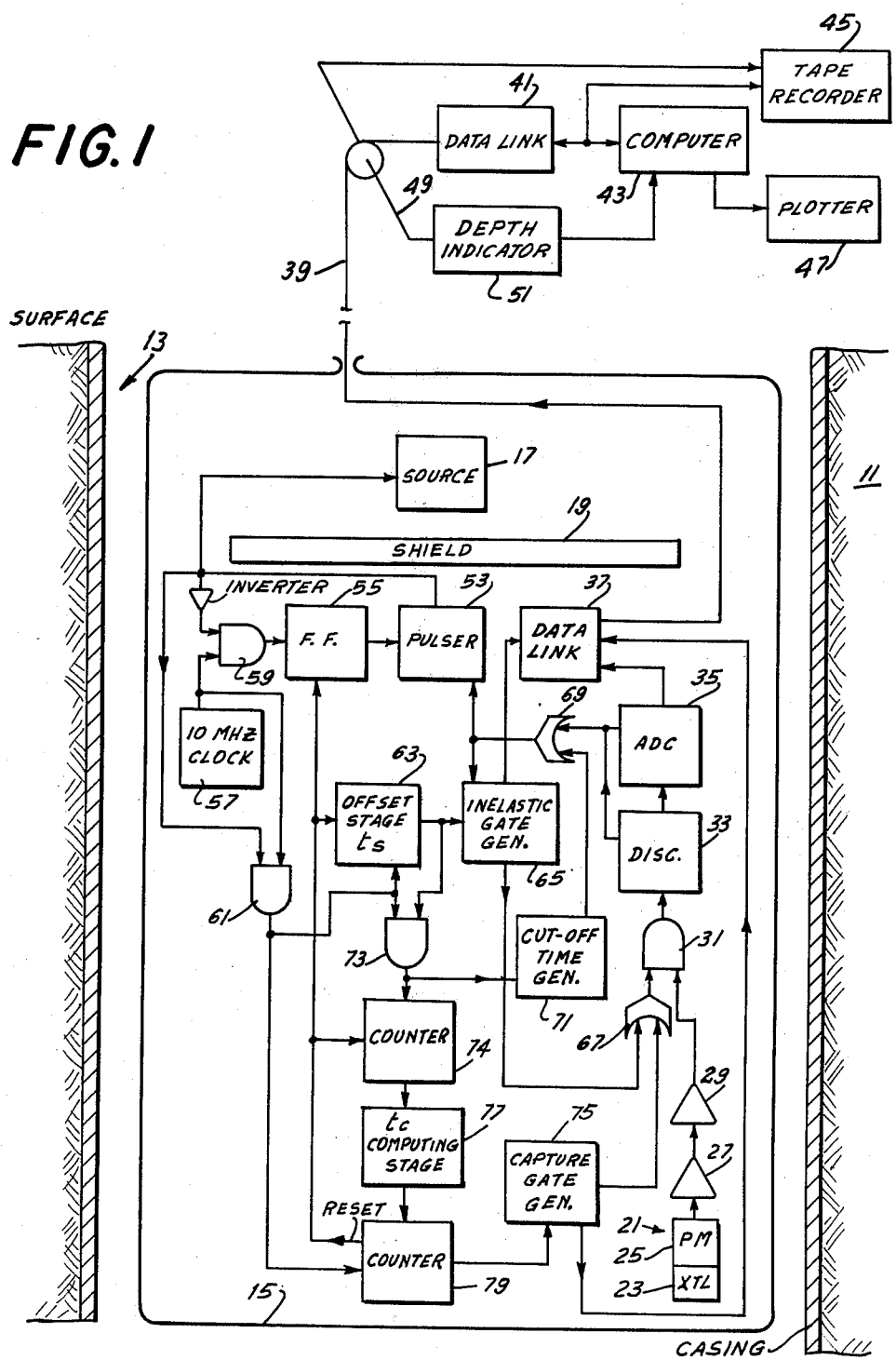
FIG. 1 is a block diagram of a well logging tool useful in practicing the invention.

In an illustrative embodiment of the invention, FIG. 1, depicts in section an earth formation 11 in which a borehole 13 is formed. A logging tool 15, in accordance with an embodiment of the present invention, includes a neutron source 17, of the aforementioned accelerator type, located at an upper end of the tool. The source 17 is isolated by a neutron shield 19 to minimize activation of a detector 21 and the sonde portions adjacent the detector by direct irradiation from the source.

Gamma radiation resulting from interactions between the fast neutrons generated by source 17 and formation nuclei is detected by a scintillation crystal 23 which is optically coupled to a photomultiplier tube 25. The tube 25 in response to a gamma ray incident on the crystal 23, generates a pulse signal whose amplitude is representative of the energy of the gamma ray. Output pulses (gamma ray counts) from the photomultiplier 25 are then passed by a follower buffer amplifier 27 and, after appropriate shaping in amplifier 29 are fed through a linear gate 31 and a discriminator 33. Linear gate 31 receives another input from gating circuits (to be later described) for control of the time portion of the detector pulses to be analyzed. Discriminator 33 will be understood to include the usual low-level and high-level discriminators to limit the energy range to be analyzed and sorting the incoming pulses according to amplitude into a number of energy segments or channels over the gamma ray energy range of interest.

The output signals from the discriminator 33 are applied to an analog-to-digital converter stage 35 before their reception by a data link circuit 37 for transmission to the surface. Link circuit 37 may be of any conventional construction for encoding, time-division multiplexing or otherwise preparing the data-bearing signals applied to them in a desired manner and for impressing them on a multiconductor cable 39 which supports the tool. Cable 39 is additionally employed to provide a conduit for electrical power from the surface to the tool 15. The data link circuits disclosed in the commonly-owned U.S. Pat. No. 4,012,712, filed Mar. 31, 1975 by W. B. Nelligan for "System for Telemetering Well-Logging Data", are particularly useful. The disclosure of the Nelligan patent is herein incorporated by reference.

At the surface the transmitted data-bearing signals are received in data link circuits 41, where they are amplified, decoded and otherwise processed as needed for application to a computer 43 and to a tape recorder 45. Illustratively, the computer sums the counts in each channel over the energy range of interest and transmits signals indicative thereof to a visual plotter 47 to generate plots of the gamma ray spectra. The tape recorder 45 and plotter 47 are conventional and are suitable to provide the desired record of logging signals as a function of depth. The usual cable-following linkage, indicated schematically at 49, and depth indicator 51 are provided for this purpose.

Neutron generator or source 17 effects generation of a neutron burst when signals of predetermined duration and repetition rate are applied thereto from a pulser stage 53. Pulser stage 53, in turn, provides an output when enabled by the output of a flip-flop 55, the operation of which is initiated at the start of an output pulse from a 10 MHz clock 57. An AND gate 59 is interposed between the output of the clock 57 and the flip-flop 55 to disable triggering of the flip-flop 55 when the pulser is "on". The other input to gate 59 is the inverted output of pulser stage 53.

Since generation of neutrons by source 17 is effected only after the elapse of a given start-up time $t_s$, it will be appreciated that gating circuits for control of the time portion of the detector pulses to be analyzed will have to be correspondingly adjusted for this start-up time. To this end the outputs of both clock 57 and pulser stage 53 are applied to respective input terminals of a second AND gate 61 whose output is applied to an offset circuit 63 which effects an output after a delay period $t_s$. The output of offset circuit 63 is applied to an inelastic gate generator 65 whose output, applied through OR gate 67, is received by AND gate 31 to enable transmission through discriminator 33 of detector pulses during a time interval corresponding to the neutron burst interval.

The gating signal generated by discriminator 33 which signalized the detection of a gamma ray having energy levels falling within the selected threshold values, is further employed, through an OR gate 69, to control pulser 53 to effect a halt in the generations of neutrons by source 17. This output signal of OR gate 69 is further applied to the inelastic gate generator 65 so as to effect the disablement of AND gate 31. In the event that no gamma ray having the requisite energy level is detected, an output pulse from a cut-off time signal generator 71 is supplied to an input terminal of OR gate 69 to effect, in a manner similar to that described above with regard to the effect of the gating signal output of discriminator 33, a halt in the generation of neutrons by source 17 and a disablement of AND gate 31.

Cut-off time generator 71 receives the output of an AND gate 73 having two input terminals one, through gate 61, representing the output of clock 57 and the other being the output of offset circuit 63. The output of cut-off time generator 71 represents the upper limit $\Delta t_{max}$ which is allowed for the detection of a gamma ray, during enablement of the inelastic gate, to occur. $\Delta t_{max}$ is chosen, for example, to equal 50 microseconds.

Since it is often desirable to detect a capture gamma ray spectrum as well as the inelastic neutron scattering gamma ray spectrum, a capture gate generator 75 provides an output which is applied, through OR gate 67, to AND gate 31 for control of an additional capture gate time interval $t_c$ or portions thereof following the neutron burst interval. It will be appreciated that the capture gate can be divided into sub-intervals and may also be lesser than the interval between succeeding bursts of neutrons. To this end, capture gate generator may include conventional counting circuits to subdivide the capture gate interval. Encoding bits, to identify the information collected in the respective subdivided intervals, may be supplied to data link 37. In a similar manner, the inelastic gate generator 65 supplies encoding bits to data link 37 to identify information collected in the inelastic measurement interval.

The output of AND gate 73, representing the output of the clock 57 during the neutron burst interval $t_n$, by virtue of AND gate 61 which provides an end to the interval when the source 17 is turned off and AND gate 73 which effects the start of the interval after delay $t_s$, is applied to counter 74 where the clock pulses are counted to provide a representative signal of the interval. The output of counter 74, representative of the neutron burst duration, is supplied to a computing stage 77 where a time interval $t_c$ is computed. This time interval is chosen to bear a predetermined relationship to the neutron burst interval $t_n$. For example, $t_c$ may be chosen such that the ratio of $t_s+t_n$ (the interval during which the source 17 is turned on) to $t_s+t_n+t_c$ (the period of the burst) is constant. Moreover, such a ratio may be chosen to be equivalent to a duty cycle which optimizes the operational efficiency of neutron generator or source 17. Of course other relationships may be chosen, for example $t_c$ may be chosen such that the ratio of $t_n/(t_s+t_n+t_c)$ is a constant so that the output of neutron generator 17 is optimized for neutron production. Other relationships may be selected, for example the burst period $t_s+t_n+t_c$ may be a constant and the mean burst interval $<t_n>$ selected in relation to the burst period so as to minimize capture contributions to the inelastic measurement. The output of computing stage 77 is supplied to a counter 79 which effects enablement of capture gate generator 75 for an interval $t_c$ following the end of the neutron burst interval. Counter 79 additionally effects a reset of counter 74, offset stage 63 and flip-flop 55 at the end of the interval $t_c$ so as to enable the commencement of a new cycle of operation of the apparatus.

Figure 2:
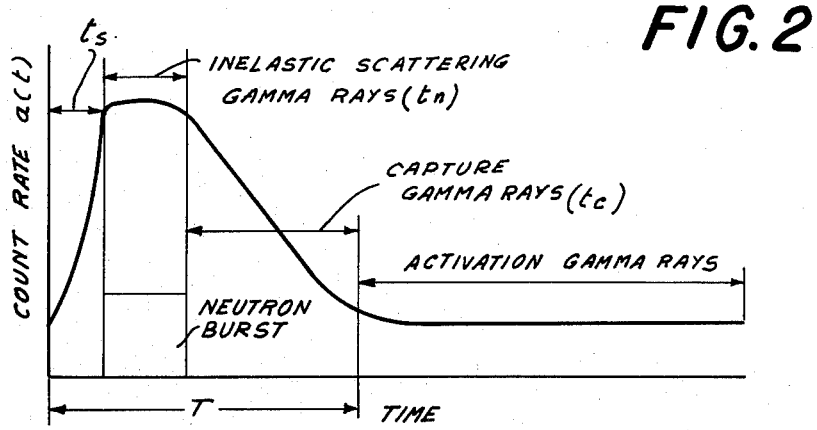
FIG. 2 is a graph of gamma ray activity resulting from irradiation of a formation with a pulse of neutrons.

As may be seen from FIG. 2, the portions of the time distribution of gamma rays following a neutron burst in which inelastic scattering gamma rays, on the one hand, and thermal neutron capture gamma rays, on the other hand, predominate, provides the opportunity, by appropriate gating of a detector relative to the time of occurrence of the neutron burst, for selectively detecting the appropriate gamma rays for counting purposes. It will be appreciated that the source turn-on interval includes a delay $t_s$ between initial source activation and the beginning of the source output of neutrons.

Turning now to the theoretical considerations of the operations of the well logging tool of FIG. 1, we first need consider the effects of the random nature of gamma ray production during pulsed neutron scattering in order to calculate our data acquisition rates for various pulsing modes of operation.

Averaging produces the following general picture of the gamma ray count rate during pulsed generator operation. The generator is pulsed on for a time interval $\Delta t$ at a rate $f_o$ for a period T and a duty cycle j:

$$f_o = 1/T = j/\Delta t. \tag{1}$$

For now, we need not know what values of $f_o$ or $\Delta t$ are used, only that the generator requires some constant mean duty factor, e.g., $<j> = 0.22$, so that eqn. (1) is a boundary condition for optimum neutron output. It can be noted that it has been verified experimentally that the neutron burst shape follows the ion-source generator pulse shape closely, except for an instant inception delay $t_s$ of approximately 10 μsec. FIG. 2 shows the typical occurrence (with respect to time and neutron bursts) of gamma rays detected in the detector crystal and averaged over many such bursts. The result is a time dependent mean gamma-ray count rate a(t) having an exponential decay between neutron bursts representing mostly the thermal neutron capture gamma ray production. The choice of the burst repetition period T with respect to the thermal decay time $\tau$ of a formation under investigation will affect the amount of capture background during the burst. Also, if $\Delta t$ is too long, there will be too much capture background build up during the burst. This leaves us with a vague (because of the variation in $\tau$) upper limit of $\Delta t \leq 100$ μsec. A second aspect of neutron generation is that a(t) is more or less constant during the neutron burst. It is proportional to the instantaneous neutron production rate during the burst $N_n$, i.e., $$a = b_n N_n, \tag{2}$$

which we will assume for the sake of analysis to be constant over many burst intervals. The constant of proportionality $b_n$ reflects the macroscopic scattering cross-section in the formation and the detector efficiency.

The detection of gamma rays during the burst is random with a Poisson frequency distribution as discussed in Evans, R. D., "The Atomic Nucleus," McGraw-Hill, 1955. The probability of detecting x number of gamma rays during an interval of length t, during which the mean count rate is a, is given by, $$P_x(t) = (at)^x e^{-at}/x!. \tag{3}$$

The probability of detecting any gamma rays during the interval $\Delta t$ depends on the width of the interval. In particular, for short intervals $\Delta t$ (such that $a\Delta t \leq 1$), the probability of detecting more than one gamma ray during the interval is much less than the probability of detecting only one.

The average number of gamma rays that occur in any interval of length $\Delta t$ is just $a \cdot \Delta t$. Since there are $f_o$ intervals of length $\Delta t$ per unit time, the data acquisition rate will be:

$$K = f_o a \Delta t = ja. \qquad (4)$$

Given a gamma ray count rate "a" during the burst, eqn. (4) represents the maximum data acquisition rate possible. Because of the dead time associated with the data processing electronics the system is sensitive to the first event occurring during the detector gate, but insensitive for a short interval after the first event is detected. We shall now consider such a system which detects only the first event in a short burst and ignores all succeeding events. The probability of an interval of length $\Delta t$ having no event occuring is $P_o(\Delta t)$. Therefore, the probability of an interval having at least one or more events is, $$P_{x \geq 1}(\Delta t) = 1 - P_o = 1 - e^{-a\Delta t}. \qquad (5)$$

For such a system, the data acquisition rate is, $$K = f_o(1 - e^{-a\Delta t}). \qquad (6)$$

for very small $a\Delta t$, eqn. (4) is an approximation of eqn. (6).

An alternate approach to the result in eqn. (6) is to calculate the number of intervals between the random events described by $P_x(t)$ that lie in a detector gate $\Delta t$.

For this calculation the interval distribution analysis referenced in the aforementioned Evans publication is employed. During the burst where the mean count rate is "a", and the average interval between gamma rays is $1/a$, the probability that the duration of a particular interval between gamma rays will lie between $t$ and $t + dt$ is $dP_t$:

$$dP_t = P_o(t)adt = ae^{-at}dt. \qquad (7)$$

Averaging over a large number of intervals (per unit time) $f_o$, the number of intervals $K$ (per unit time) greater than $t=0$ but less than $t=\Delta t$ is, $$K = f_o \int_0^{\Delta t} ae^{-at}dt = f_o(1 - e^{-a\Delta t}), \qquad (8)$$

which is the result obtained in eqn. (6).

The term harmonic pulsing is used to indicate the use of fixed width neutron bursts and detector gates in accordance with prior art practices.

For a fixed burst interval and fixed burst repetition rate system, the data acquisition rate is given by eqn. (8). This data acquisition rate is illustrated as a function of the incident gamma ray rate "a", in FIG. 3, by the dashed line curves for different burst periods (illustratively 50, 75 and 100 microseconds) calculated for a duty cycle $j=0.22$.

The term random pulsing is used to indicate a pulsing technique where the neutron burst and detector gate $\Delta t$ are left on until either a gamma ray is detected or an upper limit $\Delta t_{max}$ is reached. Because the detector gate (and neutron burst) intervals $\Delta t$ now have random length, there will be many times when a gamma ray will be detected early, i.e., for $(\Delta t < t_{max})$, allowing the neutron bursts to be shut off early and those neutrons "saved" for a later burst. Of course, if the maximum extension of the burst interval $\Delta t$ were infinite, there would be no net gain. Choosing $\Delta t_{max} = m(1/a)$, where $2 < m < \infty$, the following result is obtained from eqn. (8), $$K = f_o(1 - e^{-m}). \qquad (9)$$

We now consider the mean interval $<\Delta t>$, which is calculated by using the interval distribution (eqn. (7)). If all intervals are allowed to occur (m infinite), the following result is obtained: $<\Delta t> = 1/a$. However, by truncating the long (and less probable) intervals from the distribution average, the result is:

$$<\Delta t> = \int_0^\infty t\, dP_t = \frac{1}{a}(1 - e^{-m}), \qquad (10)$$

where
$dP_t = a e^{-at}dt$ for $0 \leq t \leq \Delta t_{max}'$
$\quad = a e^{-at}\delta(t - \Delta t_{max})dt$ for $t \geq \Delta t_{max}'$
and
$\Delta t_{max} = m/a$.

where $\delta$ is the dirac delta function

For any finite m, the obvious result $<\Delta t> < 1/a$ is obtained; a very important fact when the data acquisition rate is low. Since the mean interval is reduced, the generator may be operated in a manner such that the mean burst interval width is equal to the constant burst interval width of the prior art practices. This in effect results in an increase in the data acquisition rate K since some of the intervals are allowed to be longer than the prior art constant burst interval when necessary to effect acquisition of a gamma ray count.

Figure 3:
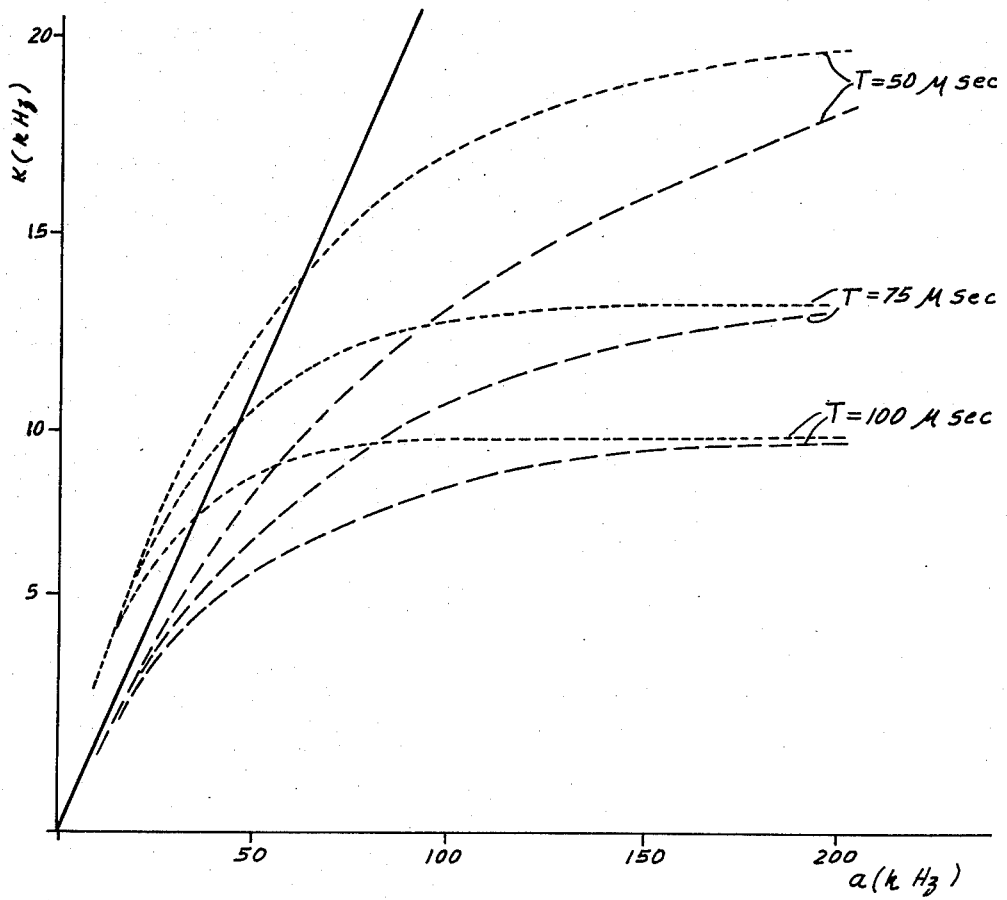
FIG. 3, is a graphical representation of data acquisition rates in accordance with the practices of the prior art and those of the present invention.

From eqn. (9) the data acquisition rate K can be calculated, for $m = a(bT - t_s)$, where $b = 0.5$, is an assumed maximum source pulsing duty cycle, and $t_s = 6$ $\mu$sec. The dotted curves, illustrated in FIG. 3, represent a graph of K as a function of the incident gamma ray rate "a" for 50, 75 and 100 microsecond burst periods respectively. It will be appreciated, from the curves, that at the lower incident gamma-ray rates the data acquisition rate K is significantly improved when compared to the data acquisition rate of corresponding prior art generator pulsing techniques (dashed line curves).

Where the mean duty factor $<j> = <\Delta t> f_o$ is maintained constant, a variable burst frequency is enabled thusly increasing K again. More data for the same generator output is obtained under this mode of operation.

Combining eqns. (1), (9) and (10), the data acquisition rate K may be computed as:

$$K = (1 - e^{-m})j/<\Delta t> = ja. \qquad (11)$$

which equals the maximum rate theoretically possible and is illustrated by the solid line curve of FIG. 3. It will be appreciated of course that at the lower incident count rates "a" eqn. (11) reduces to eqn. (9) since the maximum extension of the burst interval $\Delta t$ is not infinite but is subject to the $\Delta t_{max}$ limitation. However, at the higher incident count rates "a" the data acquisition rate is demonstrably superior to that illustrated by the previously discussed neutron generator pulsing techniques.

While the invention has been particularly shown and described with reference to preferred embodiments thereof, it will be understood by those skilled in the art that various changes in form and details may be made therein without departing from the spirit and scope of the invention. For example, the neutron generator pulsing mode is equally applicable to other pulsed sources of radiation. All such changes, therefore, are intended to be included within the spirit and scope of the appended claims.

What is claimed is:

1. A method for logging a formation surrounding a borehole, comprising the steps of:
    irradiating said formation with a succession of discrete bursts of fast neutrons, each burst having a variable time interval;
    detecting radiation occasioned in said formation by said fast neutrons;
    limiting the number of fast neutrons emitted during an individual burst by shortening the variable time interval of said individual burst as a function of the detected radiation during said individual burst; and
    continuously varying the frequency of occurrence of said succession of discrete bursts to conform the relationship between said variable time interval and the following time interval before the next discrete burst to a predetermined relationship.

2. The method in accordance with claim 1 wherein said detected radiation is respectively a single gamma ray occurring subsequent to the commencement of said individual burst.

3. A method for logging the formations surrounding an earth borehole, comprising the steps of:
    initiating a succession of bursts of fast neutrons and irradiating said formations with said neutrons during a variable time interval for each of said bursts;
    detecting radiation occasioned in said formations as the result of said fast neutrons;
    terminating an individual burst of fast neutrons by shortening said variable time interval as a function of radiation detected during said individual burst; and
    varying the frequency of occurrence of said succession of discrete bursts to provide for a constant duty cycle of said succession of bursts.

4. A method for logging a formation surrounding a borehole, comprising the steps of:
    irradiating said formation with a succession of discrete bursts, at a given burst period, of fast neutrons, each burst having a variable time interval;
    detecting radiation occasioned in said formation by said fast neutrons;
    selecting a burst time interval, relative to said burst period, which reduces the contribution to the detected radiation of radiation occasioned by other than the inelastic scattering of fast neutrons; and
    limiting the number of fast neutrons generated in each of said bursts by shortening said variable time interval as a function of said detected radiation such that the mean burst time interval resulting corresponds to said selected burst time interval.

5. The method in accordance with claim 4 wherein said detected radiation is respectively a single gamma ray occurring subsequent to the commencement of each of said bursts of fast neutrons.

6. The method in accordance with claims 1, 3, or 4, further comprising the step of recording the detected radiation as a function of borehole depth.

7. Apparatus for providing a radioactivity log of a formation surrounding a borehole, comprising:
    means for irradiating said formation with a succession of discrete bursts of fast neutrons, each burst having a variable time interval;
    means for detecting radiation occasioned in said formation by said fast neutrons;
    means for limiting the number of fast neutrons generated in an individual burst by shortening said variable time interval as a function of radiation detected during said individual burst; and
    means for varying the frequency of occurrence of said succession of discrete bursts to provide for a predetermined relationship between said variable time interval and the time interval between succeeding discrete bursts which follows each of said bursts.

8. Apparatus for logging the formations surrounding an earth borehole, comprising:
    means for initiating a succession of bursts of fast neutrons and irradiating said formations with said neutrons during a variable time interval of each of said bursts;
    means for detecting radiation occasioned in said formations as the result of said fast neutrons;
    means for terminating an individual burst of fast neutrons by shortening said variable time interval as a function of radiation detected during said individual burst; and
    means for varying the frequency of occurrence of said succession of discrete bursts to provide for a constant duty cycle of said succession of bursts.

9. Apparatus for providing a radioactivity log of a formation surrounding a borehole, comprising:
    means for irradiating said formation with a succession of discrete bursts, at a given burst period, of fast neutrons, each burst having a variable time interval;
    means for detecting radiation occasioned in said formation by said fast neutrons; and
    means for limiting the number of fast neutrons generated in each of said bursts by shortening said time interval as a function of said detected radiation such that the mean burst time interval resulting corresponds to a selected burst time interval, wherein said selected burst time interval is such that, relative to said burst period, the contribution to the detected radiation of radiation occasioned by other than the inelastic scattering of fast neutrons is reduced.

10. The apparatus of claims 7, 8 or 9, further comprising:
    means for recording the detected radiation as a function of borehole depth.

11. A well logging apparatus for the investigation of earth formations surrounding a borehole, comprising:
    means for generating a succession of bursts of radiation at a variable frequency, the time duration of each burst being variable;
    means for detecting, during a plurality of time intervals comtemporaneous with respective ones of said bursts, radiation occasioned in said formations by said radiation bursts;
    first means for controlling the time duration of each burst in accordance with the output of said detecting means; and
    second means for controlling the frequency of said succession of bursts in accordance with the output of said detecting means.

12. The apparatus of claim 11 wherein said second controlling means comprises means for controlling the time of initiation of a succeeding burst of radiation in response to the output of said detecting means such that the time duration of each burst bears a predetermined relationship to the respectively following time interval between bursts.

13. The apparatus of claim 12 further comprising means for recording a representation of the output of said detecting means as a function of borehole depth.

14. A method for providing a radioactivity log of a formation surrounding a borehole, comprising the steps of:
- irradiating said formation with a succession of discrete bursts of fast neutrons, each burst having a variable time interval;
- detecting radiation occasioned in said formation by said fast neutrons;
- limiting the number of fast neutrons generated in an individual burst by shortening said variable time interval as a function of radiation detected during said individual burst; and
- varying the frequency of said succession of discrete bursts as a function of said detected radiation.

15. The method in accordance with claim 14 further comprising the step of recording the detected radiation as a function of borehole depth.

16. Apparatus for providing a radioactivity log of a formation surrounding a borehole, comprising:
- means for irradiating said formation with a succession of discrete bursts of fast neutrons, each burst having a variable time interval;
- means for detecting radiation occasioned in said formation by said fast neutrons;
- means for limiting the number of fast neutrons generated in an individual burst by shortening said variable time interval as a function of radiation detected during said individual burst; and
- means for varying the frequency of said succession of discrete bursts as a function of said detected radiation.

17. The apparatus of claim 16 further comprising:
means for recording the detected radiation as a function of borehole depth.

* * * * *